US012570578B2

(12) United States Patent (10) Patent No.: US 12,570,578 B2
Zhong (45) Date of Patent: Mar. 10, 2026

(54) ARTIFICIAL CEMENT-BASED ULTRA-HIGH-PERFORMANCE STONE

(71) Applicant: Bing Zhong, Hubei (CN)

(72) Inventor: Bing Zhong, Hubei (CN)

( * ) Notice: Subject to any disclaimer, the term of this patent is extended or adjusted under 35 U.S.C. 154(b) by 931 days.

(21) Appl. No.: 17/299,810

(22) PCT Filed: Sep. 20, 2019

(86) PCT No.: PCT/CN2019/106904
§ 371 (c)(1),
(2) Date: Jun. 4, 2021

(87) PCT Pub. No.: WO2020/114041
PCT Pub. Date: Jun. 11, 2020

(65) Prior Publication Data
US 2021/0387915 A1 Dec. 16, 2021

(30) Foreign Application Priority Data

Dec. 7, 2018 (CN) .......................... 201811491642.0

(51) Int. Cl.
| | |
|---|---|
| *C04B 28/04* | (2006.01) |
| *B28B 1/08* | (2006.01) |
| *B28B 23/02* | (2006.01) |
| *C04B 40/00* | (2006.01) |
| *C04B 103/30* | (2006.01) |

(Continued)

(52) U.S. Cl.
CPC ................ *C04B 28/04* (2013.01); *B28B 1/08* (2013.01); *B28B 23/02* (2013.01); *C04B 40/0042* (2013.01); *E04F 13/0805* (2013.01); *E04F 13/0885* (2013.01); *C04B 2103/302* (2013.01); *C04B 2111/542* (2013.01)

(58) Field of Classification Search
None
See application file for complete search history.

(56) References Cited

U.S. PATENT DOCUMENTS

| | | | |
|---|---|---|---|
| 4,642,960 A * | 2/1987 | Wallover, III | .......... E04C 2/041 52/681 |
| 2015/0345140 A1* | 12/2015 | Karle | ........................ E04C 2/06 52/782.1 |

FOREIGN PATENT DOCUMENTS

| CN | 102003055 A | 4/2011 |
|---|---|---|
| CN | 201826475 U | 5/2011 |

(Continued)

OTHER PUBLICATIONS

Bajader et al., UHPC evolution, development, and utilization in construction: a review, Journal of Materials Research and Technology, 10; 2021; 1058-1074. (Year: 2021).*

(Continued)

*Primary Examiner* — David Sample
(74) *Attorney, Agent, or Firm* — McClure, Qualey & Rodack, LLP

(57) ABSTRACT

A cement-based artificial stone plate includes a cement-based plate body; and a metal mesh being embedded in the cement-based plate body; wherein the metal mesh is arranged with at least one fixing member, the fixing member defines a screw hole along its axis, and the screw hole of the fixing member is exposed on back of the cement-based plate body, and back of the plate body is provided with regular or irregular protrusions, between any two protrusions forms a groove, and bottom of each groove is close to the metal mesh.

9 Claims, 5 Drawing Sheets

100

(51) Int. Cl.
    _C04B 111/54_        (2006.01)
    _E04F 13/08_          (2006.01)

(56)                     References Cited

FOREIGN PATENT DOCUMENTS

| CN | 204001325 | U  | * | 12/2014 | |
| CN | 104533046 | A  |   | 4/2015 | |
| CN | 108033760 | A  | * | 5/2018 | ........... C04B 28/105 |
| CN | 108193858 | A  |   | 6/2018 | |
| CN | 108675728 | A  | * | 10/2018 | ............. B28B 1/087 |
| CN | 109356351 | A  |   | 2/2019 | |
| CN | 109577578 | A  |   | 4/2019 | |
| JP | 2007002609 | A |   | 1/2007 | |
| KR | 101435603 | B1 | * | 8/2014 | |

OTHER PUBLICATIONS

Ultra-High Performance Concrete, FHWA Publication No. FHWA-HRT-11-038, US Department of Transportation, Federal Highway Administration (Year: 2011).*

NPCA White Paper, Ultra High Performance Concrete (UHPC); Guide to Manufacturing Architectural Precast UHPC Elements, (Year: 2013).*

Gagg et al., "Cement and concrete as an engineering material: An historic appraisal and case study analysis," Engineering Failure Analysis, 40 (2014) 114-140. (Year: 2014).*

International Search Report mailed Dec. 17, 2019, issued in application No. PCT/CN2019/106904.

* cited by examiner

100

ARTIFICIAL CEMENT-BASED ULTRA-HIGH-PERFORMANCE STONE

FIELD

The subject matter herein generally relates to architectural decoration, in particular to cement-based ultra-high-performance artificial stone plates.

BACKGROUND

Existing building walls used for decoration into stone effect plates, mainly comprises two types, natural stone plates and ceramic imitation stone plates. Natural stone plates are made of naturally-formed stone through cutting, grinding, sandblasting and other methods. The decorative plate and ceramic imitation stone plate are plates made of natural stone by burning clay at high temperature. The installation methods mainly include wet paste and dry hanging.

Wet paste: Wet paste uses sticky mortar to paste the board to the wall to be decorated, which is a rigid connection. Due to thermal expansion and contraction caused by outdoor wind pressure, rain, and temperature difference, it will accelerate the viscosity of the mortar. The reduction, coupled with the large dead weight of the board, can easily cause the board to fall off, and the rigid connection is extremely poor in seismic resistance. The current wet sticking method is only used when decorating the lower floors of the building. The use of high-rise buildings is basically prohibited.

Dry hanging: Dry hanging first needs to install a metal dragon skeleton on the wall to be decorated for carrying the board. Since the naturally formed stone itself is already in a solid state, it is impossible to place embedded parts for external connection. Ceramics cannot be placed inside because of high-temperature firing. The two plates can only be slotted or perforated on the side of the plate or perforated on the back of the plate to be installed with the metal connection piece and the load-bearing dragon skeleton. Stones and ceramics are relatively brittle, and the fittings that are stuck in the side grooves or holes during installation need to carry the weight of the plate. If the plate is thin, the thin wall is easy to cause the edge to fall off; the back is perforated and the plate is thin Hole punching is easy to break, the shallow hole hanging strength is low, and the safety is poor, so the thickness of dry hanging stone is not less than 25 mm, the time for ceramic to dry hanging is short, and its thickness standard has not been specified, but the ceramic board needs a certain thickness. To ensure its safety, the weight of dry hanging stone per square meter exceeds 65 kg, so that the dragon skeleton used for carrying plates also needs to maintain a certain strength to carry its weight, so the cost of manufacturing and installation of the metal dragon skeleton is large and heavier The installation cost of the board is also very high, and due to the heavy weight of the board, the structure of the house needs to be increased to bear it, which also causes the construction cost of the house to increase, the stone mining damages the environment, and the ceramic high-temperature firing wastes energy and easily causes pollution.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
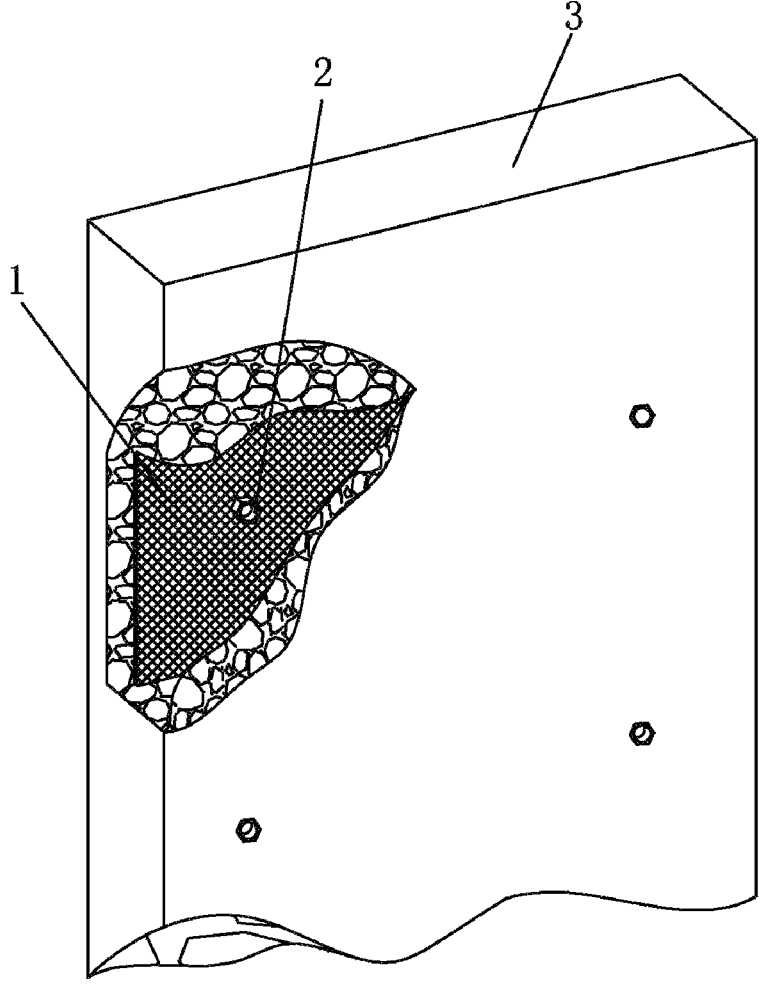
FIG. 1 is a diagram of an exemplary embodiment of a artificial cement based ultrahigh performance stone of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Example 1

Figure 2:
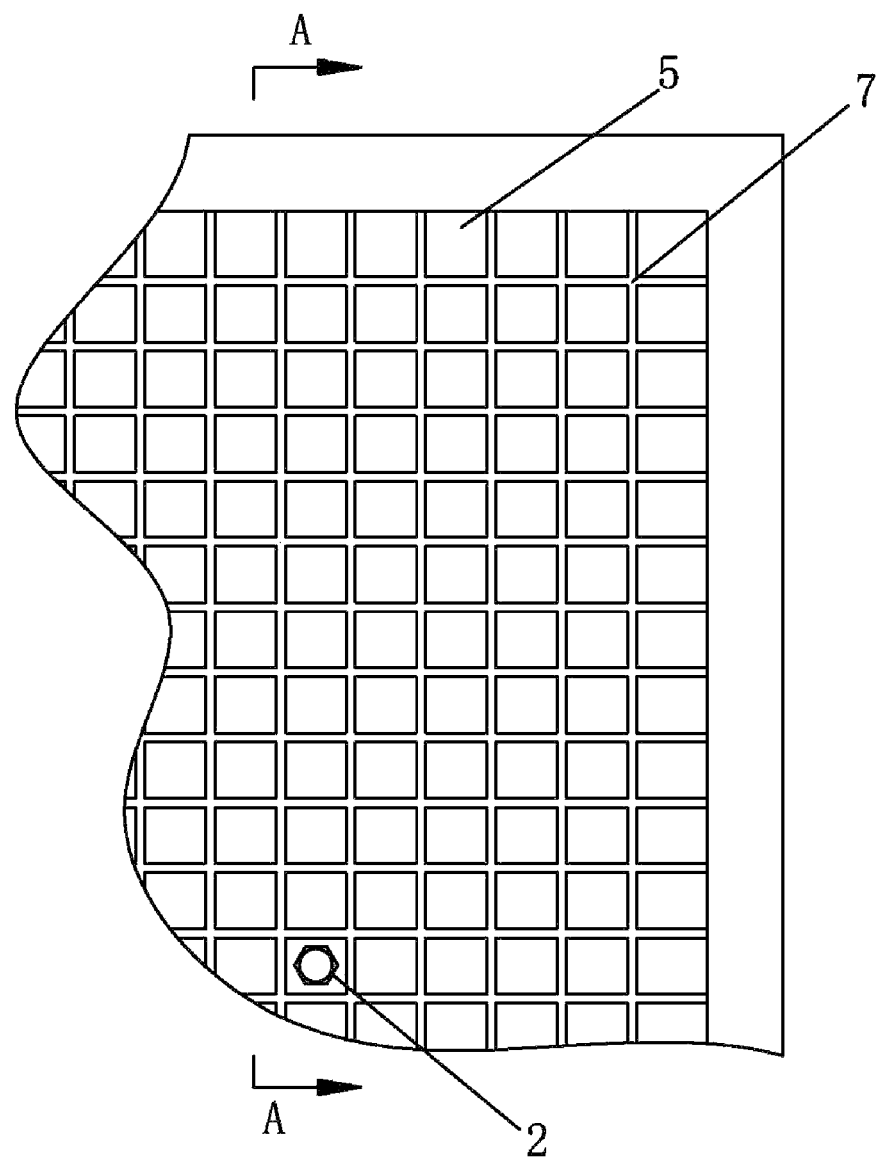
FIG. 2 is a partial enlarged view of back of the artificial cement based ultrahigh performance stone of FIG. 1
Figure 3:
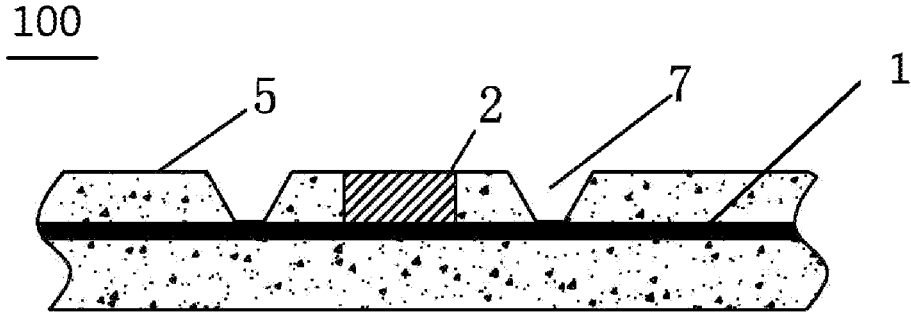
FIG. 3 is a cross-sectional view taken along line A-A of FIG. 2.

FIGS. 1-3 illustrate an exemplary embodiment of a artificial cement based ultrahigh performance stone 100. The cement-based artificial stone plate includes an ultra high performance concrete (UHPC) plate body 3; and a metal mesh 1 is embedded in the plate body 3. In the embodiment, the metal mesh 1 is a stainless steel mesh.

Referring to FIGS. 1-3, a plurality of fixing members 2 are welded and fixed on the stainless steel mesh 1. In the embodiment, the fixing member 2 is made from stainless steel. In the embodiment, the fixing member is stainless steel nut. The fixing member defines a screw hole along its axis. Number of the fixing member is at least two, in the embodiment, number of the fixing member is 4. Screw hole of the fixing member 2 is leveled with back of the cement-based plate body 3. In the embodiment, the cement-based plate body 3 is made by strong vibration, strong pressure, and vacuum. A thickness of the cement-based plate body 3 is 8-12 mm. Manufacturing process of the cement-based ultra high performance concrete (UHPC) artificial stone plate is as follows:

Step 1

Raw material configuration: Portland cement 100 parts by weight, silica fume 8 parts by weight, slag powder 20 parts by weight, 4-6 mesh yellow rice stone 60 parts by weight, 4-6 mesh black rice stone 20 parts by weight, 10-20 mesh yellow rice stone 50 Parts by weight, 40-80 mesh white rice stone 20 parts by weight, 80-120 mesh quartz powder 5 parts by weight, 800-1200 mesh quartz powder 5 parts by weight, polycarboxylic acid superplasticizer 0.8 parts by weight, hydrophobic powder 0.6 parts by weight, iron oxide yellow pigment 2 parts by weigh, flyash 10 parts by weight, nano titanium dioxide 1 part by weight, nano silica 1.5 parts by weight, nano calcium carbonate 2.5 parts by weight. In the embodiment, Portland cement is preferably 525 white portland cement.

Step 2

The above dry powder materials are mixed evenly by dry powder equipment to obtain dry powder, and packed in bags.

Step 3

The dry powder is added to high-performance water reduction agent the high-efficiency water-reducing agent and water in proportion and stirred for 10 minutes, and in the embodiment, all the above components in this step are coagulated by adding an appropriate amount of water, and a ratio of water to cementitious material is 0.2.

Step 4

Provide high-frequency vibration equipment, strong pressure equipment and vacuum equipment, and provide a mold frame with a size of 600 mm*900 mm, and spray mold release agent in the mold frame. In the embodiment, the strong pressure equipment is hydraulic machine.

Step 5

Put the stirred slurry into the mold frame, level the slurry and move the mold frame to the high-frequency vibration equipment, and turn on the high-frequency vibration equipment, and vibrate the mold frame for 10 to 15 seconds.

Step 6

Lay a stainless steel mesh 1 with several fixing members 2 on surface of the slurry at a determined position, and lay an insulation cloth on surface of the stainless steel mesh. Stainless steel fixing member 2 and stainless steel mesh have an advantages of anti-corrosion. The stainless steel mesh will not be rusted when it is cut into any size when installed, which overcomes the defects of the ordinary metal mesh and steel fiber that are easy to rust.

4

Step 7

Turn on the hydraulic machine and align a pressure plate with a same specification to the mold frame. Press 20 seconds with a pressure about 500 tons, and turn on the vacuum machine to evacuate to −0.08 MPa at the same time. The two operations are synchronized. In the embodiment, the pressure plate is provided with regular grooves to form regular protrusions (as shown in FIGS. 1, 2, and 3) on the cement-based plate body, and the protrusions 5 allow the metal mesh to completely solidify in the cement-based plate body. The groove between any two protrusions 5 is close to the metal mesh 3. The working principle is: the metal mesh with nut is set on the vibrated slurry surface, and the insulation cloth is arranged on the metal mesh, and then the hydraulic machine press back of the plate body, and the metal mesh is permeated into the slurry, and the slurry is permeated into the other side of the metal mesh, and the insulation cloth is always located on top surface of the slurry, and it is convenient to remove the insulation cloth afterwards.

Step 8

Take out the isolating cloth and send the pressed plate 3 with a pallet to a steam curing room for curing.

Step 9

Customize the cured plate to a standard thickness with a thickness-setting machine.

Step 10

Polish the determined thickness plate with a stone continuous polishing machine.

Step 11

Dry and spray surface protective agent, and send it to construction site. Color of the artificial stone plate: yellow; high-gloss surface; specifications: a thickness of the cement-based ultra-high-performance artificial stone plate is about 10 mm, and a size of the cement-based ultra-high-performance artificial stone plate is about 600*900 mm.

Example 2

Figure 4:
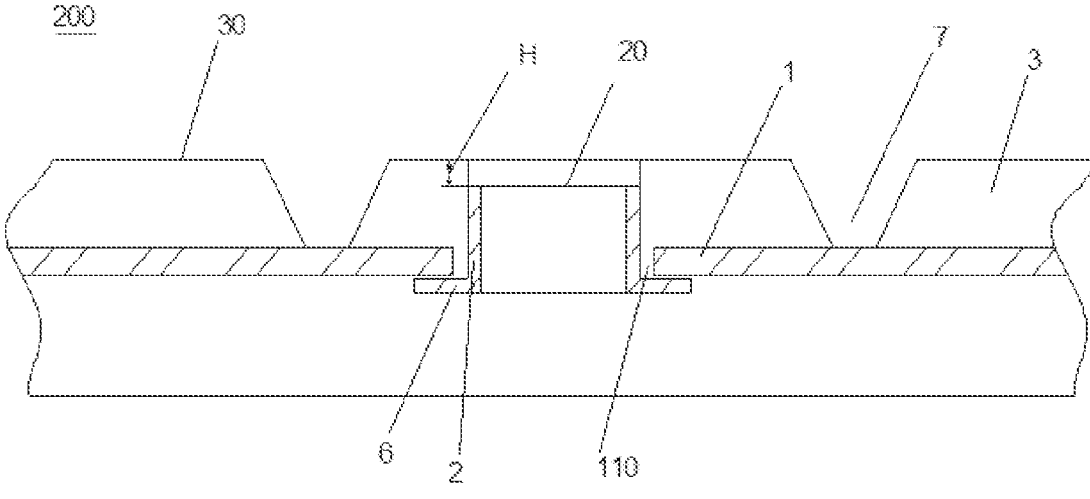
FIG. 4 is another cross-sectional view of taken along line A-A in FIG. 2.

As shown in FIGS. 1-2 and FIG. 4, the cement-based ultra-high-performance artificial stone plate 200, includes an ultra high performance concrete (UHPC) plate body, the cement-based plate body is embedded with a stainless steel mesh 11, and the metal mesh 11 is mounted with several fixing members 2. In the embodiment, the fixing member 2 is stainless steel nut.

Bottom of the fixing member 2 is provided with a wing plate 6, as shown in FIG. 4. The metal mesh 11 is arranged with a plurality of mesh holes 110, and each fixing member 2 is corresponded to a mesh holes 110 at the metal mesh 1. A size of the wing plate 6 is bigger than a corresponding mesh hole 110, and main body of the fixing member 2 passes through the mesh hole 110 of the metal mesh 11, the wing plate 6 is located at the bottom of the mesh hole 110 and screw hole 20 of the fixing member 2 is lower than back 30 of the plate body 3. The screw hole of the fixing member is not less than back of the cement-based plate body. In the embodiment, screw hole 20 of the fixing member 2 is not less than back of the cement-based plate body in a range of 0-4 mm, preferably, 4 mm.

The stainless steel mesh has demolition resistance, so that the plate's aggregate and the stainless steel mesh are completely integrated. Rigidity and toughness of the stainless steel wire make the artificial stone plate not break or fall off even when it is very thin. A thickness of the cement-based plate body is in a range of 5-8 mm, and a specific manufacturing process is as follows:

Step 1

Provide raw material, and raw material configuration: Portland cement 100 parts by weight, silica fume 8 parts by weight, slag powder 20 parts by weight, 4-6 mesh red rice stone 60 parts by weight, 4-6 mesh black rice stone 20 parts by weight, 10-20 mesh yellow rice stone 50 Parts by weight, 40-80 mesh white rice stone 20 parts by weight, 80-120 mesh quartz powder 5 parts by weight, 800-1200 mesh quartz powder 5 parts by weight, polycarboxylic acid superplasticizer 0.8 parts by weight, hydrophobic powder 0.6 parts by weight, iron oxide yellow pigment 2 parts by weigh, flyash 10 parts by weight. In the embodiment, Portland cement is preferably 525 white portland cement.

Step 2

Mix the above dry powders evenly through dry powder equipment to obtain dry powders and pack them in bags.

Step 3

Add high-efficiency water-reducing agent and water into the dry powder in proportion and stir for 10 minutes, and in the embodiment, all the above components in this step are coagulated by adding an appropriate amount of water, and a ratio of water to cementitious material is 0.25.

Step 4

Provide strong vibration equipment, strong pressure equipment and vacuum equipment, and provide a mold frame with a size of 600 mm*600 mm, and spray mold release agent in the mold frame. In this embodiment, the strong vibration equipment, strong pressure equipment and vacuum equipment is a four-column hydraulic press, the four-column hydraulic press is an all-in-one machine with high frequency vibration (725-1450 times/min) and strong pressure (1000-2000 KN) and vacuum (below 0.06 MPa).

Step 5

Put the stirred slurry into the mold frame, level the slurry and turn on the high-frequency vibrator, and vibrate for 10 to 15 seconds.

Step 6

Set more than one fixing member on the vibrated slurry at a determined position, lay the metal mesh 1 and the isolation cloth, and the metal mesh is stainless steel mesh.

Step 7

Figure 5:
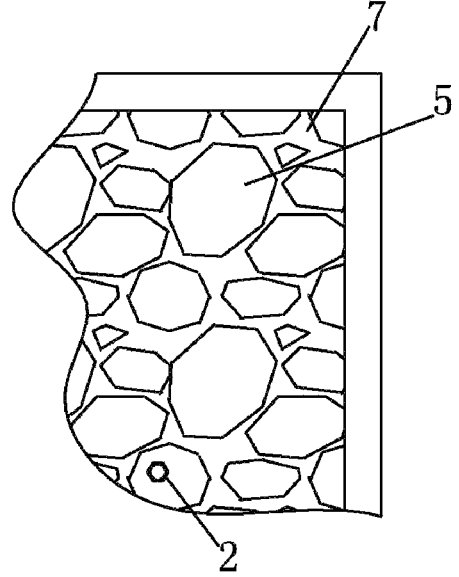
FIG. 5 is a schematic view of back of the artificial cement based ultrahigh performance stone with irregular protrusions.

Turn on the strong pressure equipment, and align a pressure plate with irregular grooves of the same specifications to the mold frame to form irregular protrusions (as shown in FIG. 5). The protrusions 5 allow the metal mesh to completely solidify in the plate body. The groove 7 between any two of the embedded protrusions 5 is close to the metal mesh sheet, pressed at 500 tons for 20 seconds and simultaneously turned on the vacuum machine to evacuate to −0.08 MPa, the two operation is synchronized.

Step 8

Take out the isolating cloth and send the pressed plate 3 to the steam curing room for curing with a pallet.

Step 9

Customize the cured plate to a standard thickness with a thickness-setting machine.

Step 10

Use sandblasting machine to form sandblasting surface.

Step 11

Dry and spray surface protection agent and send it to construction site. Product color: red; sandblasted surface; specifications: 600*600 mm; thickness: 8 mm.

Embodiment 3

Cement-based artificial stone plate, thickness of the plate is 15-25 mm.

A structure and manufacturing process are the same as those in Embodiment 2.

Product color: red; sandblasted surface; specifications: 1600*3200 mm; thickness 25 mm.

Embodiment 4

A thickness of the plate body is 12-15 mm, the specific manufacturing process is as follows:

Step 1

Raw Material Configuration:

Raw material configuration: Portland cement 100 parts by weight, silica fume 8 parts by weight, slag powder 20 parts by weight, 4-6 mesh yellow rice stone 60 parts by weight, 4-6 mesh black rice stone 20 parts by weight, 10-20 mesh yellow rice stone 50 Parts by weight, 40-80 mesh white rice stone 20 parts by weight, 80-120 mesh quartz powder 5 parts by weight, 800-1200 mesh quartz powder 5 parts by weight, polycarboxylic acid superplasticizer 0.8 parts by weight, hydrophobic powder 0.6 parts by weight, iron oxide red pigment 2 parts by weigh, and flyash 10 parts by weight. In the embodiment, Portland cement is preferably 525 white portland cement.

Step 2

Mix the above dry powders through dry powder equipment to make dry powders and pack them in bags.

Step 3

Add high-efficiency water-reducing agent and water into the dry powder in proportion and stir for 10 minutes, and in the embodiment, all the above components in this step are coagulated by adding an appropriate amount of water, and a ratio of water to cementitious material is 0.16.

Step 4

Provide strong vibration equipment, strong pressure equipment and vacuum equipment, and provide a mold frame with a size of 1000 mm*1000 mm, and spray mold release agent in the mold frame.

Step 5

Put the stirred slurry into the mold frame, level the slurry and turn on the high-frequency vibrator, and vibrate for 10 to 15 seconds.

Step 6

Set more than one fixing member on the vibrated slurry at a determined position, lay the metal mesh 1 and the isolation cloth, the metal mesh is stainless steel mesh.

Step 7

Turn on the strong pressure equipment, and align a pressure plate with irregular grooves of the same specifications to the mold frame to form irregular protrusions. The protrusions 5 allow the metal mesh to completely solidify in the plate body. The groove 7 between any two of the embedded protrusions 5 is close to the metal mesh sheet, pressed at 500 tons for 20 seconds and simultaneously turned on the vacuum machine to evacuate to −0.08 MPa, time of the two operation is synchronized.

Step 8

Take out the isolating cloth and send the pressed plate 3 using a pallet to a steam curing room for curing.

Step 9

Customize the cured plate to a standard thickness with a thickness-setting machine.

Step 10

Use sandblasting machine to form sandblasting surface, the sandblasting surface is a front surface of the cement-based artificial stone plate.

Step 11

Dry and spray surface protection agent and send it to construction site. Product color: red; sandblasted surface; specifications: 1000*1000 mm; thickness: 12 mm.

Figure 6:
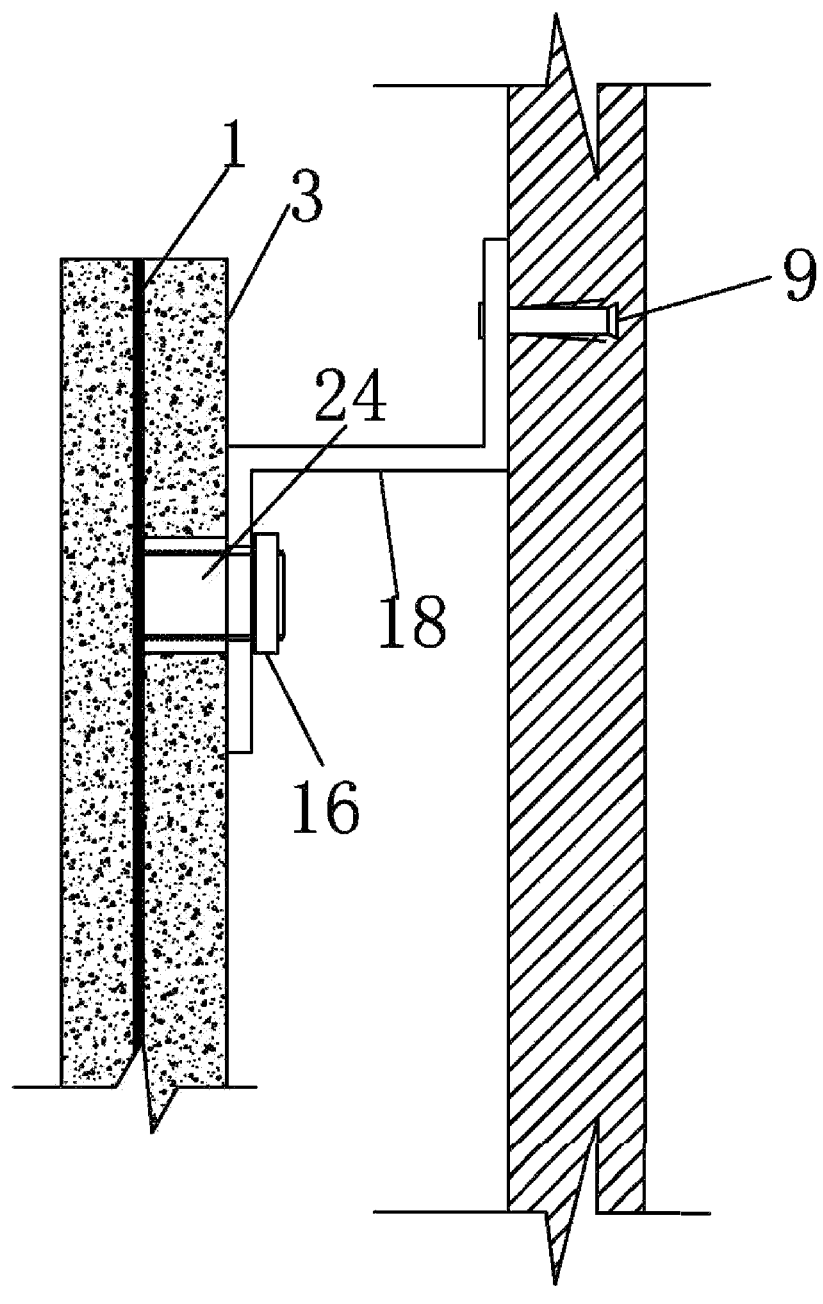
FIG. 6 is a schematic diagram of an installation status of the artificial cement based ultrahigh performance stone of FIG. 1 of the present disclosure.

FIG. 6 is a schematic diagram of an installation status of the cement-based artificial stone plate of FIG. 1 of the present disclosure. As shown in FIG. 6, the steel bar 18 is bent into a "Z"-shaped. Both ends of the steel bar 18 are respectively provided with at least one screw holes. Screw 24 passes through a fastening nut 16, one screw hole of one end of the steel bar 18 to connect with the stainless steel fixing member 2 on the cement-based ultra-high-performance artificial stone plate, and thereby the end of the steel bar 18 is pressed on the back of the cement-based ultra-high-performance artificial stone plate. Insert an expansion bolt 9 through the screw hole at the other end of the steel bar 18 and implant it into the wall. Tighten the expansion bolt 9 to fix the "Z"-shaped steel bar 18 to the wall to complete the installation of the artificial stone plate.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An artificial ultra-high performance concrete (UHPC) stone, comprising:

providing UHPC artificial stone slurry, at least one fixing member and a metal mesh, providing high-frequency vibration equipment, strong pressure equipment and vacuum equipment, and providing a mold frame;

putting the mixed slurry into the mold frame, starting the high-frequency vibration equipment to vibrate, placing the at least one fixing member on a surface of the slurry, laying the metal mesh, turning on a hydraulic machine and aligning a pressure plate with a same specification to the mold frame, and turning on the vacuum equipment, two operations are synchronized, the pressure plate is provided with regular grooves to form regular protrusions on the plate body; and aligning a pressure plate with irregular grooves of the same specification to the mold frame to form irregular protrusions; the protrusions allow the metal mesh to solidify in the plate body, the metal mesh is embedded in the plate body; wherein the metal mesh is arranged with the at least one fixing member, the at least one fixing member defines a screw hole along its axis, and the screw hole of the fixing member is exposed on a back of the plate body, and the back of the plate body is provided with regular or irregular protrusions, between any two protrusions forms a groove, and a bottom of each groove is next to the metal mesh.

2. The artificial ultra-high performance concrete stone of claim 1, wherein a thickness of the plate body is in a range of 5-25 mm.

3. The artificial ultra-high performance concrete stone plate of claim 1, wherein the metal mesh is stainless steel mesh, and the fixing member is a stainless steel nut.

4. The artificial ultra-high performance concrete stone of claim 1, wherein the opening of the screw hole of the fixing member is at a depth of 0-4 mm from the back surface of the plate body.

5. The artificial ultra-high performance concrete stone of claim 4, wherein the opening of the screw hole of the fixing member is level with the back of the plate body.

6. The artificial ultra-high performance concrete stone of claim 1, wherein a bottom of the fixing member is provided with a wing plate around the fixing member.

7. The artificial ultra-high performance concrete stone of claim 6, wherein the metal mesh is arranged with a plurality of through holes, and each fixing member is corresponded to a through hole at the metal mesh, and the wing plate of the fixing member is located at bottom of the mesh hole, and a size of the wing plate is bigger than a corresponding mesh hole.

8. The artificial ultra-high performance concrete stone of claim 3, wherein a bottom the fixing members is welded and fixed on the stainless steel mesh.

9. The artificial ultra-high performance concrete stone of claim 1, wherein the number of the fixing member is at least two.

\* \* \* \* \*